J. T. GORDON.
MANUFACTURE OF RUBBER TIRES.
APPLICATION FILED FEB. 12, 1908.
903,707.
Patented Nov. 10, 1908.
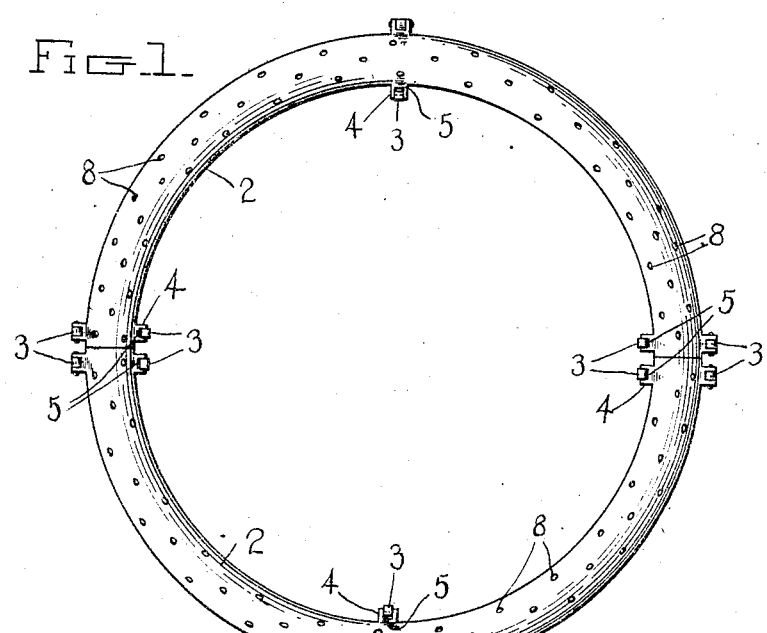
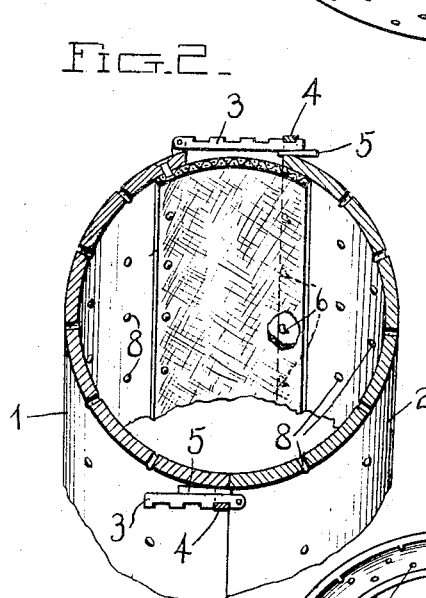
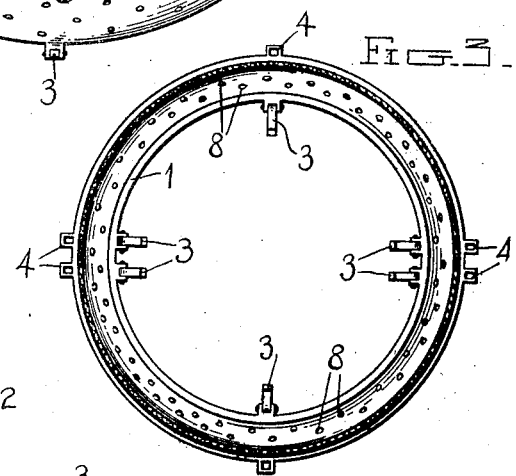
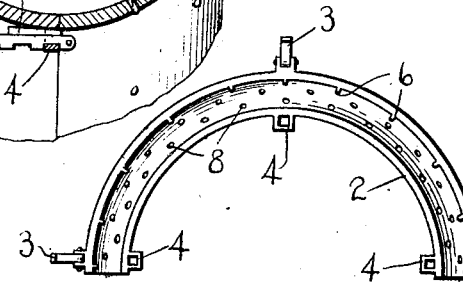
Witnesses
L. B. James
A. E. Bordner
Inventor
James T. Gordon,
By
Herrick Herrick & Kent
Attorneys

UNITED STATES PATENT OFFICE.

JAMES T. GORDON, OF INDIANAPOLIS, INDIANA.

MANUFACTURE OF RUBBER TIRES.

No. 903,707.

Specification of Letters Patent.

Patented Nov. 10, 1908.

Application filed February 12, 1908. Serial No. 415,471.

*To all whom it may concern:*

Be it known that I, JAMES T. GORDON, a citizen of the United States, residing at Indianapolis, in the county of Marion and State of Indiana, have invented certain new and useful Improvements in the Manufacture of Rubber Tires, of which the following is a specification.

This invention relates to a device for use in the manufacture of rubber tires more particularly, and has for its object to provide a device whereby tires may be formed without the necessity of going through the rather expensive process which is now commonly employed.

Tires are at present made up by placing over a form or core, a thickness of fabric, covered with rubber prepared for the purpose. This is covered by another layer of the fabric, and the latter by more rubber. This process is repeated until the tire arrives at the desired thickness. Thereupon the aggregated mass is wrapped with strips of canvas round about, until several thicknesses of the latter have been applied. Thereupon the tires thus wrapped are taken to ovens, or air-tight tanks, into which steam is turned, and they are heated for several hours in a high degree of heat, until the rubber is united with the surrounding layers of fabric. As a consequence on account of the porosity of the fabric, the outside wrapper is found t obe baked fast to the rubber, and is difficult of removal, the stripping operation being one of considerable difficulty and requiring much time. This process is called the " open-cure process," for the reason that the outside wrapper, being porous, permits access of the steam to the tire mass, and also allows the moisture that has accumulated therein to escape.

It is the principal object of my invention, accordingly, to obviate the necessity for the final wrapping and consequently expensive stripping. This object I accomplish by substituting for the final wrapper a surrounding shell of metal, properly apertured to allow of the egress and ingress of steam and moisture, and having provision for ready assemblage and disassemblage about the tire mass.

In the accompanying drawings, in which are illustrated a merely preferred form of embodiment of the invention, Figure 1 is a plan view of the shell; Fig. 2 is a broken section on an enlarged scale through the shell and showing the means for fastening the parts thereof together; Fig. 3 is a plan view of the endless annular half-section of the device; and Fig. 4 is a similar view of one of the segments comprising the other half section.

Referring to the numerals on the drawings, 1 indicates an endless annular half-section, of a size to correspond with the tire to be treated, and substantially semi-circular in cross-section. Adapted to be assembled with half-section 1, to form a complete shell, are a plurality of segmental sections 2, likewise semi-circular in cross-section. The annular section 1 and the segmental sections 2 are provided with means for fastening them together in the position shown in Fig. 2. Any convenient fastening means can be adopted, but I prefer to use the devices shown, comprising a locking-pin 3 hinged thereto and adapted to take into a keeper-loop 4 upon the opposite section or half-section. Said pin is preferably provided with a number of indentations into which the upper part of the keeper-loop fits, for the sake of adjustability, and the pin is held in adjusted relation in the loop as by means of a wedge 5. As shown, I prefer to provide the sections and half-sections with locking-pins on one edge and keeper-hooks on the other edge, so that the opposing tensions may serve the better to hold the devices together, section or half-sections, as the case may be, being provided at points opposite a loop or pin in the opposing member with a loop or pin to correspond. Firmly attached, as by riveting, to the inside of the annular section, near one edge, is a strip of canvas or the like, extending around the circumference of the annulus. This strip extends beyond said edge, and is adapted to be engaged with the inside portions of the opposing segmental sections near their edges as by means of prongs or hooks 6 in said members (see Fig. 2).

The annular section and the complementary segmental sections are perforated as indicated at 8, to allow of free escape of steam or moisture from the interior of the shell when the parts thereof are assembled and the device is in use. It is preferred to make the shell of some such metal as aluminum, which on account of its relatively small responsiveness to heat or cold, will contract or expand very little, so that there will be no distortion of the device.

The operation of the device will be readily apparent from the illustration and description. The properly formed tire mass is inserted in the annular section shown in Fig. 3, with the canvas strip extending over the tread of the tire. The segmental sections are now applied, the canvas strip being engaged with the hooks 6 and the adjacent fastening devices adjusted to any desired and proper extent. The other edges are now brought together and securely fastened, the canvas being thereby stretched over the tread of the tire very tightly. The apparatus is now ready for the oven. When the tire is sufficiently treated, the locking devices are unfastened, and the tire may be readily removed, there being no tendency to stick to the smooth metal casing. By this means much tedious and difficult labor is avoided and the finished product is much less roughened and disfigured than by the use of an outside wrapper or cloth which is apt to be fused together with the rubber and must be rudely torn therefrom.

What I claim is:—

1. In a device of the character described, a casing adapted to completely envelop a tire, comprising opposed members semi-circular in cross-section assemblable to form a hollow annulus, and means for locking said members in the assembled relation, comprising a plurality of locking-pins upon one edge of one member, and a corresponding plurality of keeper-loops upon an edge of the opposed member.

2. In a device of the character described, a casing adapted to completely envelop a tire, comprising opposed members semi-circular in cross-section assemblable to form a hollow annulus, and means for locking said members in the assembled relation, comprising a plurality of locking-pins upon one edge of one member, and a corresponding plurality of keeper-loops upon an edge of the opposed member, the locking-pins of one member being all located upon one edge thereof, and the keeper-loops upon the other edge thereof.

3. In a device of the character described, a casing adapted to completely envelop a tire, comprising an annular half-section semi-circular in cross-section, a strip of fabric secured on the inner side of said half-section near one edge thereof, a complementary opposed member also semi-circular in cross-section and provided upon its inner side near the edge opposed to the canvas of the opposed member with a series of hooks in annular arrangement, adapted to engage the free edge of said canvas, and means for holding said opposed casing members in assembled relations.

In testimony whereof I hereby affix my signature, in presence of two witnesses.

JAMES T. GORDON.

Witnesses:
J. N. CRABB,
JNO. OGDEN.